United States Patent
Pilhall

[11] Patent Number: 5,992,937
[45] Date of Patent: Nov. 30, 1999

[54] ADJUSTABLE NECK REST

[75] Inventor: Stig Pilhall, Trollhättan, Sweden

[73] Assignee: AB Volvo, Sweden

[21] Appl. No.: 09/043,904

[22] PCT Filed: Sep. 30, 1996

[86] PCT No.: PCT/SE96/01225

§ 371 Date: May 4, 1998

§ 102(e) Date: May 4, 1998

[87] PCT Pub. No.: WO97/11860

PCT Pub. Date: Apr. 3, 1997

[30] Foreign Application Priority Data

Sep. 29, 1995 [SE] Sweden ................................ 9503390

[51] Int. Cl.⁶ .................................................. B60N 2/48
[52] U.S. Cl. .................................................. 297/408
[58] Field of Search ................................ 297/391, 408, 297/410

[56] References Cited

U.S. PATENT DOCUMENTS

| 3,572,834 | 3/1971 | Herzer | 297/410 |
| 3,817,576 | 6/1974 | Ciavattoni et al. | 297/410 X |
| 4,193,631 | 3/1980 | Hobley et al. | 297/408 |
| 4,674,792 | 6/1987 | Tamura et al. | 297/408 |
| 5,026,120 | 6/1991 | Takeda et al. | |

FOREIGN PATENT DOCUMENTS

| 0497705 A1 | 8/1992 | European Pat. Off. |
| 2235623 A1 | 1/1974 | Germany. |
| 2525013 A1 | 12/1976 | Germany. |
| 2525040 A1 | 12/1976 | Germany. |
| 1945571 B2 | 12/1977 | Germany. |
| 2646613 | 4/1978 | Germany | 297/408 |
| 3131597 A1 | 2/1983 | Germany. |
| 3244728 A1 | 6/1984 | Germany. |
| 1537551 | 12/1978 | United Kingdom. |

*Primary Examiner*—Peter R Brown
*Attorney, Agent, or Firm*—Lerner, David, Littenberg, Krumholz & Mentlik, LLP

[57] ABSTRACT

Adjustable head rests are disclosed for vehicle seats including a first support mounted on the vehicle seat, a second support pivotally mounted with respect to the first support, the second support mounting a head rest, and an adjustable control for adjusting the position of the second support into a plurality of locked annular positions with respect to the first support, the adjustable control extending substantially within the boundary surface of the head rest and adapted to be engaged by the fingers of an occupant in the vehicle seat.

11 Claims, 3 Drawing Sheets

ADJUSTABLE NECK REST

TECHNICAL FIELD

The present invention relates to an adjustable headrest according to the preamble of appended claim 1. In particular, the invention can be applied in the field of manually adjustable headrests for vehicles.

BACKGROUND OF THE INVENTION:

In the field of vehicles, for example cars, the different seats for the driver and the passengers, respectively, are normally provided with headrests. A general requirement is that the headrest should be arranged adjacent to the occupant's head so as to provide support for the neck during driving, since the occupant is normally leaning back. Furthermore, a purpose with such a headrest is to provide protection in the event of a collision.

Fixed (i.e. non-adjustable) headrests are common in today's vehicles. Although a headrest of this type normally provides good support and protection for the head of the occupant, its effect is somewhat limited since it does not provide equally high comfort and protection for all occupants. This is of course due to the fact that different occupants have different body shapes and driving positions. This problem can be solved by means of a headrest which comprises an adjustment mechanism, so that the headrest can be inclined and positioned in different angular positions in relation to the occupant's seat, i.e. in relation to the seat's backrest.

A number of different types of such adjustable headrests are previously known. One Solution is based on the principle that only frictional force is used to lock the headrest in the desired position in relation to the backrest of the vehicle seat. Furthermore, mechanisms are also known by means of which the headrest can be swung back and forth between a plurality of positions, step by step towards an end position, and wherein further tilting results in the headrest resuming its initial position so that adjustment can be carried out again. Furthermore, solutions comprising electrical adjustment of the headrest and which also may comprise a memory are previously known.

Although the previously known adjustable headrests function in an acceptable manner in most situations, they imply certain problems. Firstly, they do allow adjustment of the headrest by using one hand only, which is required from a comfort point of view of the occupant and which also is an advantage as regards safety, since the driver cannot remove both hands from the steering wheel while driving the vehicle. Another problem associated with the previously known solutions relates to the fact that they cannot normally hold the headrest in the assumed position in case of a collision or during sudden acceleration or deceleration. Naturally, this may lead to personal injuries. Furthermore, the known solution which comprises an electrical adjustment mechanism involves a disadvantage, i.e. it is too expensive to manufacture and unnecessarily complicated.

SUMMARY OF THE INVENTION

A main object of the present invention is thus to solve the above-mentioned problems and to provide an improved adjustable headrest for a vehicle, which headrest comprises an adjustment mechanism which is of a simple design, which can be adjusted by means of one hand only by the occupant, and which remains firmly fixed in its assumed position even during sudden acceleration and deceleration.

This is accomplished by means of a device as initially mentioned, the characterizing features of which will be apparent from claim 1.

By using a particular locking bracket having a number of recesses and a control device comprising a protruding section which cooperates with one of the recesses, an effective adjustment of the headrest is allowed. In this regard, the locking bracket is fixed to a bent bar or the like which is adapted for mounting in a backrest, whereas the control device is pivotally arranged in the headrest itself.

Preferably, the control device is designed as a bent bar which is arranged on the rear side of the headrest, directly under its surface and in a position where the occupant can reach it easily and actuate it with one hand. In this regard, it is important that the adjustment mechanism allows actuation by means of a one-handed grip, so as not to jeopardise the safety in a situation where it is necessary to readjust the headrest when the vehicle is in motion.

By means of the invention, a simple and effective adjustment of the headrest is provided, due to the fact that the vehicle occupant is able to actuate the control device with one hand and since the headrest can be gripped simultaneously with the hand for setting it in the desired position.

BRIEF DESCRIPTION OF THE DRAWINGS

The invention will be described in greater detail in the following with reference to the annexed drawings, in which.

PREFERRED EMBODIMENTS

Figure 1:
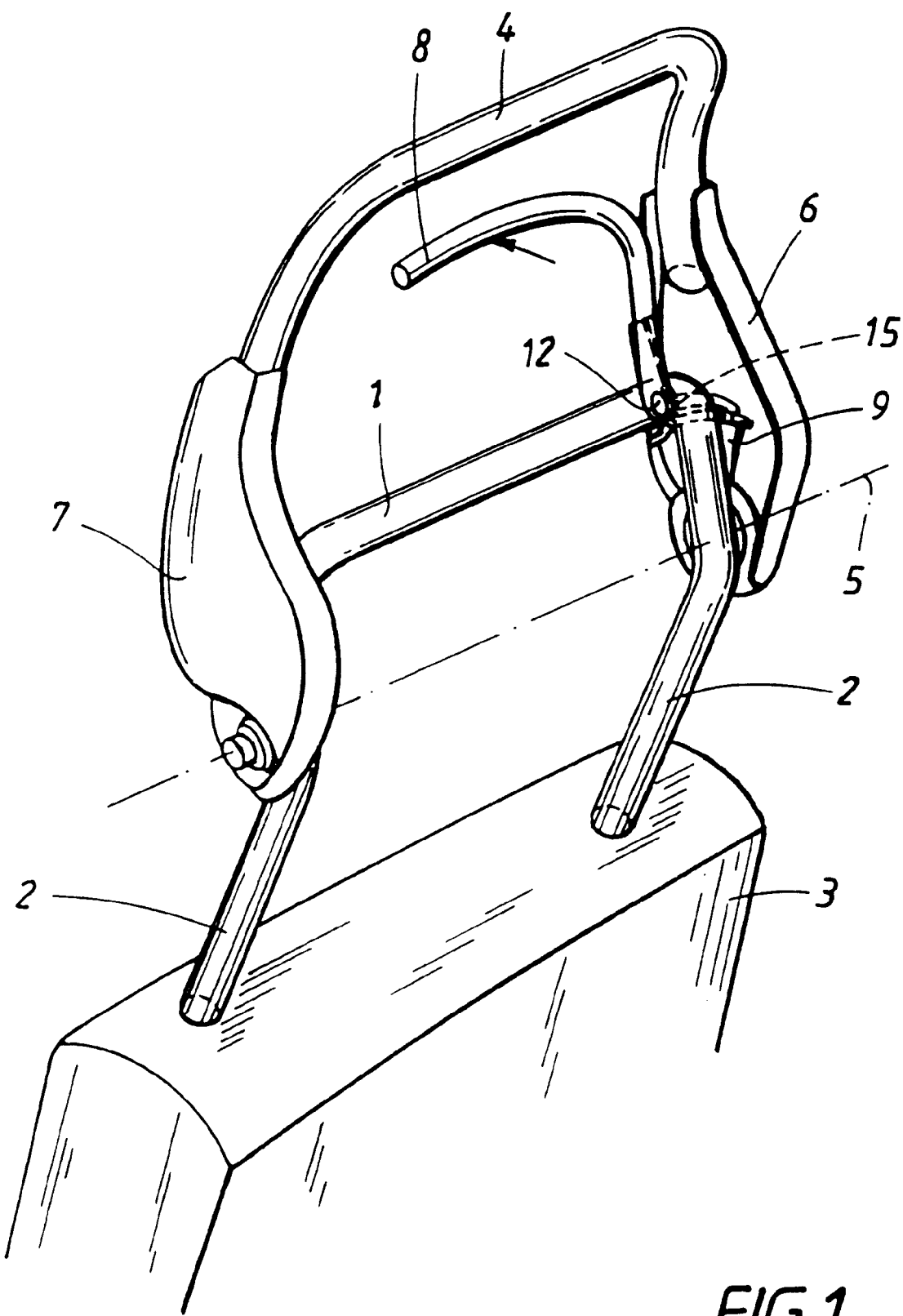
FIG. 1 is a perspective rear view, seen from an angle, of an adjustable headrest according to the present invention, which however does not show the padding of the headrest.

FIG. 1 shows a perspective view of an adjustable headrest according to the present invention. For reasons of clarity, FIG. 1 does not show any padding or the like in the headrest. Consequently, only the support structure of the headrest is illustrated.

According to a preferred embodiment, the headrest comprises a first bent bar 1 having posts 2 which are intended to be mounted in a conventional manner in a backrest 3 forming part of a vehicle seat. Furthermore, the headrest also comprises a component in the form of a second bent bar 4 which is pivotally arranged on the two posts 2. To this end, the second bar 4 is fixed in the respective post 2 by means of a rotary attachment (not shown in detail) so as to define an axis of rotation 5. In this manner, the second bar 4 constitutes a part which can be set at different angular positions in relation to another part, i.e. the first bar 1.

In a conventional manner, the second bar 4 carries padding and covering (not shown in FIG. 1), thereby forming a headrest. The second bar 4 is preferably designed with two plate-shaped elements 6, 7. Consequently, these elements 6, 7 form extensions of the second bar 4, i.e. they form the frame for the sides of the headrest.

Furthermore, the invention comprises a control device 8 which is pivotally arranged on one of the plate-shaped elements 6. According to the detailed description below, the control device 8 cooperates with a locking bracket 9 which is fixed to the first bar 1, preferably on the side of one of the two posts 2.

Figure 2:
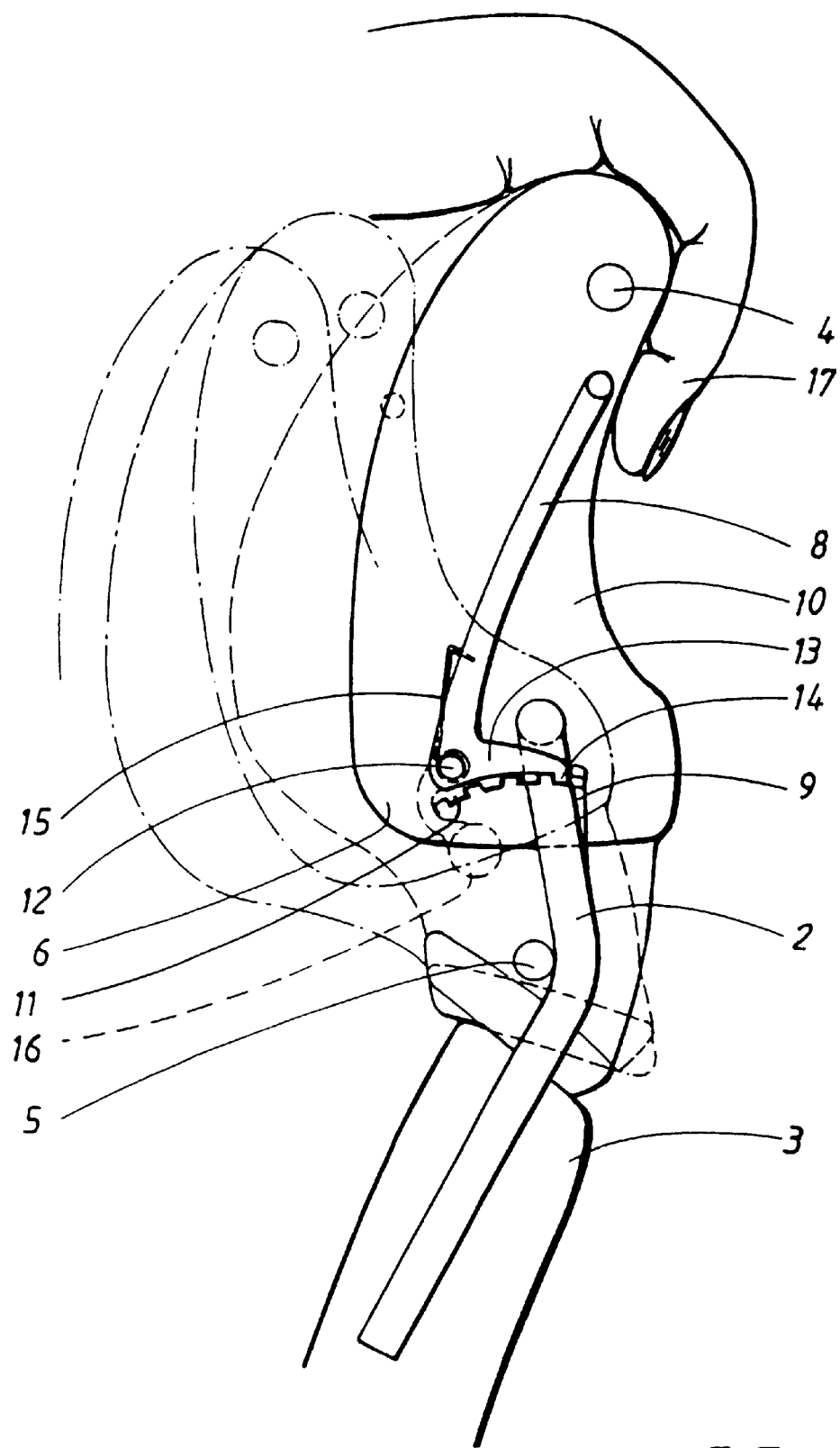
FIG. 2 is a side view of the headrest according to FIG. 1.

FIG. 2 shows a side view of the headrest according to the invention. This drawing also shows the headrest 10 itself, i.e.

the cushion-like padding which forms a support for the occupant's head. The drawing illustrates that the locking bracket 9 is fixed to a post 2. Preferably, the locking bracket 9 is designed as a plate or the like, the upper side of which is slightly curved and designed with a plurality of holes or recesses 11 extending essentially vertically. Furthermore, the control device 8, which is pivotally arranged on the plate-shaped element 6 about an axis of rotation 12, comprises a radially protruding part 13 having a protruding section 14 in the form of a peg or the like. The control device 8 can be rotated about its axis of rotation 12 so that the protruding section 14 engages in one of the recesses 11 of the locking bracket 9. In this manner, the recesses 10 of the locking bracket 9 correspond to different angular positions for setting the headrest 10 in a certain position in relation to the backrest 3.

During use, the headrest 10 can be set at a desired angular position in relation to the backrest 3 when the occupant manually operates the control device 8. To this end, the control device 8 is designed as an L-shaped bar as is shown in detail in FIG. 1, i.e. with a first section extending along the extension of the headrest 10 and a second section extending across the extension of the headrest 10. In this regard, the first section of the control device 8 constitutes a lever for rotating the control device 8 about its axis of rotation 12, so that the protruding section 14 can be lifted out of engagement with a recess 11.

When the control device 8 is operated in the forwards direction (i.e. counter-clockwise about the axis of rotation 12, as shown in FIG. 2), the section 13 of the control device 8 will thus be turned in the counter-clockwise direction. This causes the protruding section 14 to be lifted out of the recess 11 in which it presently engages. As a result, the headrest 10 can be rotated about its axis of rotation 5 for moving it to a desired angular position. When the control device 8 is later released, the protruding section 14 is once again allowed to engage in one of the recesses 11 in the locking bracket 9, thereby locking the control device 8 in both the forward and rearward direction.

For the purpose of effectively locking the protruding section 14 of the control device 8 in one of the recesses 11, the invention preferably comprises a spring element 15 which is arranged in connection with the axis of rotation 12 of the control device 8 and which urges the control device 8 to rotate about its axis of rotation 12 in a direction towards the locking bracket 9, i.e. clockwise in FIG. 2. Preferably, the spring element 15 is constituted by a helical spring having one or several of its windings wound around the axis of rotation 12. One of the ends of the spring element 15 is fixed in the plate 6 and the other end contacts and acts upon the control device 8 so that it is urged to rotate and engage in a recess 11 in the locking bracket 9.

The invention provides a very simple operation due to the fact that the control device 8 can be operated and the headrest 10 can be set in the desired position by means of a one-handed grip. It will be noted that the operation may be carried out by pressing the upper part or alternatively the side of the headrest 10 so as to actuate the control device 8.

The control device 8 is preferably manufactured from a material which is very light, for example magnesium or the like. In this manner, the mass forces arising as a result of a collision will be as low as possible.

According to a possible embodiment, the control device 8 can be connected with a particular counterweight 16 which is arranged below the point 12 of rotation of the control device 8. As is apparent from FIG. 2, the counterweight 16 counteracts the forces which arise should a collision occur and which urges the control device 8 forwards (i.e. counter-clockwise in FIG. 2).

Figure 3:
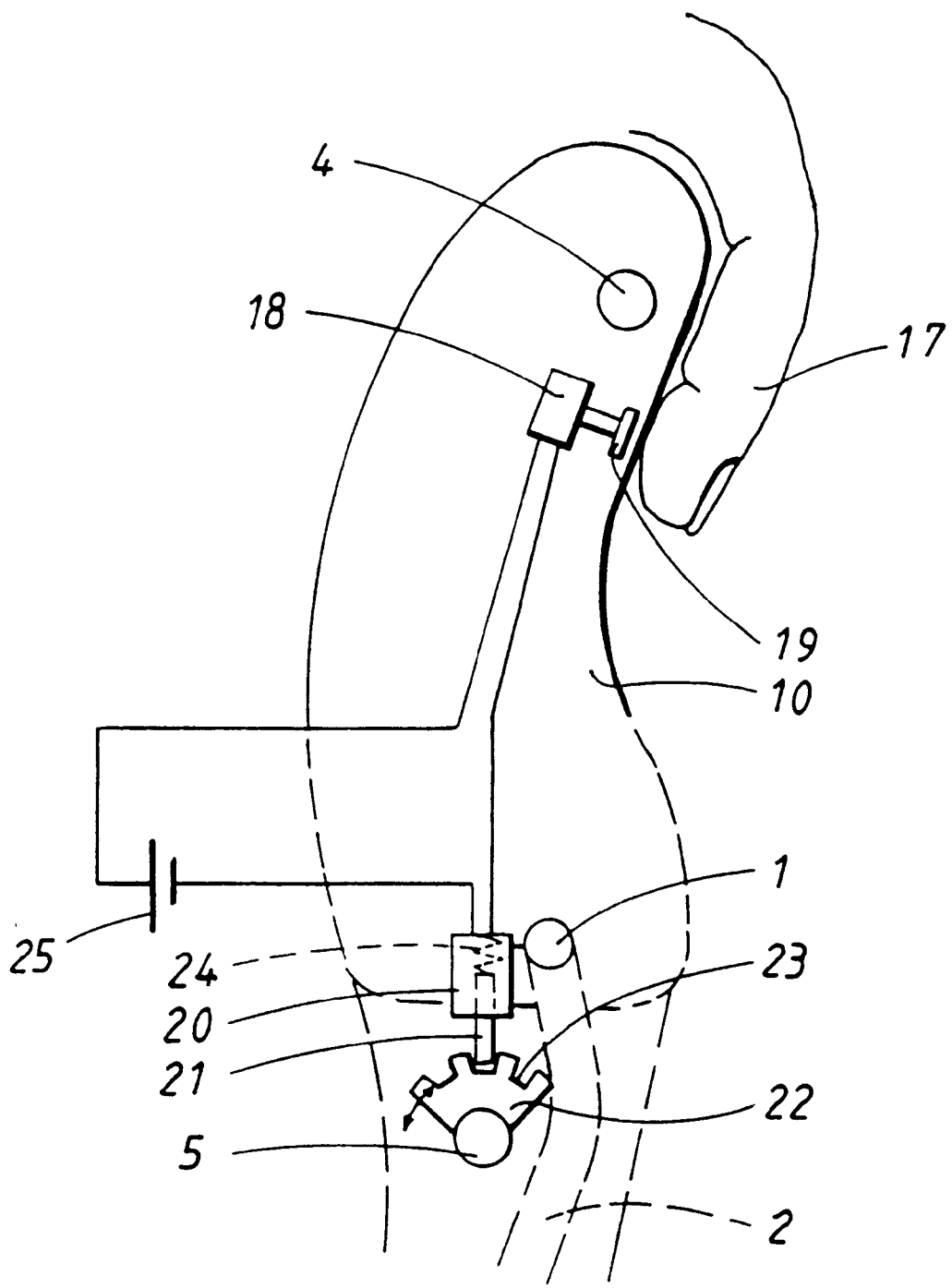
FIG. 3 is a simplified side view of a headrest according to an alternative embodiment of the invention.

FIG. 3 shows an alternative control device for adjustment of the headrest 10. According to this embodiment, the control device comprises an electrical switch 18 which in turn comprises a push button 19. As is evident from the drawing, the push button 19 is arranged in the position on the rear side of the headrest 10 where the fingers 17 of the occupant are expected to be placed when the occupant stretches back to actuate the control device.

The switch 18 is electrically connected to a solenoid 20 which is fixed to the bar 1, preferably on one of its posts 2. In a known manner, the solenoid 20 comprises a displaceable piston 21. Furthermore, the axis 5 of rotation of the headrest 10, alternatively one of the plates 6 or 7 (cf. FIG. 1), is connected to a locking bracket 22 which is designed with a plurality of grooves or recesses 23 intended to cooperate with the piston 21.

The solenoid 20 can be activated by means of voltage supply 24 which is arranged in, or in connection with, the headrest 10. In its non-activated condition, the piston 21 is actuated so as to assume a protruding position by means of a spring 25. Consequently, in this condition the piston 21 engages in one of the recesses 23, resulting in the headrest 10 being prevented from being adjusted. If the occupant actuates the switch 18 by stretching back the hand and pushing the push button 19, the solenoid 20 will be activated. This results in the piston 21 being drawn into the solenoid 20, overcoming the force from the spring 24. This in turn results in the piston 21 no longer engaging in the recess, which allows the position of the headrest 10 to be adjusted. When the headrest 10 is rotated about the axis 5, the locking bracket 22 will also be rotated to an equal degree. This results in a corresponding recess 23 being positioned directly in front of the piston 21. When the push button 19 is subsequently released, the piston 21 will be ejected once again, so that the headrest 10 will once more be locked.

In a conventional manner, the headrest 10 comprises a covering which can be constituted by a thin layer of fabric or plastic material on top of padding in the form of synthetic foam or the like. The control device 8 (alternatively 18) is preferably arranged directly underneath this covering, thereby allowing the occupant to press with one or two fingers 17 on the covering, at the position where the control device is situated, so as to activate the adjustment of the headrest.

The invention is not limited to the above-mentioned embodiments, but may be varied within the scope of the subsequent claims. For example, the control device 8 may be constituted by a bar which is designed as an inverted U and which is mounted on both sides of the headrest with two attachment positions on the second bar 4.

Furthermore, the headrest 10 can be provided with an opening or a recess on the rear side, so as to indicate the position at which the control device can be reached. Also, to this end the covering can be provided with a sewn-on patch of textile or an elevated section of the covering, both indicating where the occupant is supposed to press so as to reach the control device.

Furthermore, the different angular positions in which the headrest 10 can be set are normally three or four in number. This means that the locking bracket 9 (alternatively 22) in a corresponding manner is provided with three or four different recesses. Another number of recesses is of course also possible within the scope of the invention. As an alternative to these recesses, the locking bracket can be provided with spikes, cogs, pressed protrusions or similar shape modifications which are intended to cooperate with the control device 8 (alternatively with the piston 21).

Finally, the invention can be used both in vehicle seats in which the headrest forms a part of the backrest (so-called "articulated back") and in the cases in which the headrest constitutes a separate unit which is mounted on a backrest.

I claim:

1. An adjustable head rest for a vehicle seat comprising a first support mounted on said vehicle seat, a second support pivotably mounted with respect to said first support, said second support mounting said head rest, said head rest defining a boundary surface, and an adjustable control member for adjusting the position of said second support into a plurality of locked angular positions with respect to said first support, said adjustable control member extending substantially within the boundary surface of said head rest and adapted to be engaged by the fingers of an occupant in said vehicle seat, said adjustable control member comprising a solenoid, a locking bracket cooperating with and pivotably mounted with respect to said solenoid, whereby one of said plurality of locked angular positions of said second support may be set by the cooperative positions of said solenoid and said locking bracket, and an electrical switch for actuating said solenoid.

2. An adjustable head rest for a vehicle seat comprising a first support mounted on said vehicle seat, a second support pivotably mounted with respect to said first support, said second support mounting said head rest, said head rest defining a boundary surface, and an adjustable control member pivotably mounted with respect to said second support and including a protrusion for adjusting the position of said second support, a locking bracket affixed to said first support, said locking bracket including at least two recesses whereby said adjustable control member can be adjusted into a plurality of locked angular positions with respect to said locking bracket by adjusting said protrusion to cooperate with one of said at least two recesses, said adjustable control member extending substantially within said boundary surface of said head rest and adapted to be engaged by the fingers of an occupant in said vehicle seat.

3. The adjustable head rest of claim 2 wherein said second support is pivotably mounted with respect to said first support so as to pivot about a first axis of rotation and said adjustable control member is pivotably mounted with respect to said second support so as to pivot about a second axis of rotation, said first and second axes of rotation being substantially parallel to each other.

4. The adjustable head rest of claim 3 wherein said adjustable control member comprises a first elongated portion and a second portion, said second portion protruding substantially radially with respect to said second axis of rotation.

5. The adjustable head rest of claim 4 wherein said protrusion extends substantially perpendicularly with respect to said second portion.

6. The adjustable head rest of claim 3 including a counterweight connected to said adjustable control member, said counterweight disposed substantially below said second axis of rotation of said adjustable control member about said second support.

7. The adjustable head rest of claim 2 wherein said adjustable control member comprises a first elongated portion extending substantially along said head rest and a second elongated portion extending substantially across said head rest.

8. The adjustable head rest of claim 2 wherein said adjustable control member comprises a lightweight material.

9. The adjustable head rest of claim 8 wherein said lightweight material comprises magnesium.

10. The adjustable head rest of claim 2 including a spring for urging said adjustable control member in a predetermined direction whereby said protrusion is urged into said one of said at least two recesses.

11. The adjustable head rest of claim 2 including a back rest, said head rest being mounted on said back rest, said first support including at least one post mounted in said back rest.

* * * * *

UNITED STATES PATENT AND TRADEMARK OFFICE
CERTIFICATE OF CORRECTION

PATENT NO. : 5,992,937
DATED : November 30, 1999
INVENTOR(S) : Pilhall It is certified that error appears in the above-identified patent and that said Letters Patent is hereby corrected as shown below:

In the title, "NECK" should read --HEAD--.
Column 1, line 1, "NECK" should read --HEAD--.
Column 1, line 32, "Solution" should read --solution--.

Signed and Sealed this

Twelfth Day of September, 2000

*Attest:*

Q. TODD DICKINSON

*Attesting Officer*   *Director of Patents and Trademarks*